Dec. 4, 1962 J. VOGT 3,066,963
BALL AND SOCKET JOINTS
Filed Oct. 17, 1958

Inventor
JAKOB VOGT
BY Robert H. Jacob.
AGENT.

United States Patent Office 3,066,963
Patented Dec. 4, 1962

3,066,963
BALL AND SOCKET JOINTS
Jakob Vogt, Dusseldorf-Oberkassel, Germany, assignor to A. Ehrenreich & Cie, Dusseldorf-Oberkassel, Germany
Filed Oct. 17, 1958, Ser. No. 767,966
Claims priority, application Germany Oct. 17, 1957
2 Claims. (Cl. 287—87)

The invention relates to a ball and socket joint in which the ball is carried at least at the closed end of its housing, in spring-loaded bearing members. A spring arrangement of this kind acts to neutralise any free play in the joint and to absorb shocks resiliently. Helical springs used for this purpose have, however, the disadvantage that they are either too weak or, if they are sufficiently rigid, they take up too much height. In principle, plate springs could be used, but owing to their steep characteristic curves, their different degrees of compression on assembly, which inevitably occurs owing to inaccuracies in manufacture, gives rise to initial stresses of different amounts. If plate springs were used, therefore, the differences in the amount of yielding in the joints would be too great. In addition, there is a risk that the possible movement of the spring may not be sufficient if the initial stress is considerable.

In order to obviate the above disadvantages, the invention provides a plate spring, preferably of synthetic material, e.g. polyamide, in addition to a coil spring and arranged either in parallel or in series with it. When the springs are arranged in parallel, it is preferable to insert the plate spring in such a way that it is not quite prestressed so that the entire springing movement will still be available. When the springs are arranged in series, i.e. one behind the other, the action is normally not different from that of a joint having only a coil spring. If, however, the coil spring is completely compressed, then the plate spring comes into action to take up large shocks.

An example of an embodiment of the invention is shown in the drawing.

Figure 1:
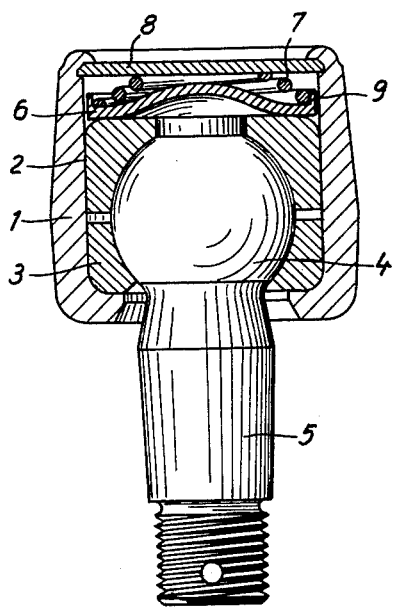
FIG. 1 is a section through a ball and socket joint.
Figure 2:
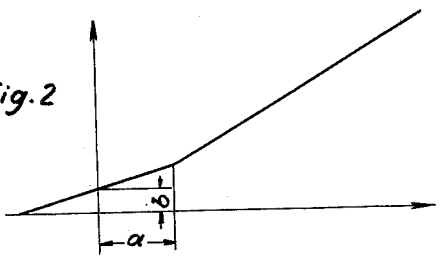
FIGS. 2 to 4 show the characteristic curves when the two springs work together, in each case with a different initial stress.

The housing of the socket is indicated by 1. It contains an upper bearing member 2 and a lower bearing member 3. The ball 4 from which a pin 5 extends is disposed in the bearing members 2, 3. The upper bearing member 2 is biased by a plate spring 6 in the form of a curved disk. A helical spring 7, which bears against a cover 8 for the housing, acts on the plate spring 6. The two springs shown in the drawing are arranged one behind the other. If a shock occurs, the bearing member 2 can first yield until the plate spring 6 meets the cover 8 of the housing. If the shock is large, the plate spring 6 will thereafter be compressed. In order to limit the movement of the plate spring 6, the latter has a collar 9 around its outer edge. The collar 9 bears against the cover 8 of the housing when the plate spring 6 has been compressed to a predetermined extent. The characteristic curve of the spring, corresponding to FIG. 1, is shown in FIG. 2. The clearance that the plate spring 6 has between the bearing member 2 and the cover 8 of the housing is indicated by $a$ and the initial stress on the coil spring is indicated by $b$. The plate spring can thus only begin to act when no clearance remains.

Figure 3:
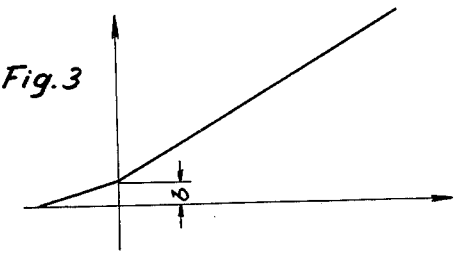

FIG. 3 shows the characteristic curve for a construction in which the plate spring has been inserted without clearance. This would appear to be the most favourable construction but can rarely be achieved, owing to inaccuracies in manufacture, as mentioned previously. The characteristic curve actually obtained approximates to that of FIG. 3 but corresponds more or less to that of FIG. 2.

Figure 4:
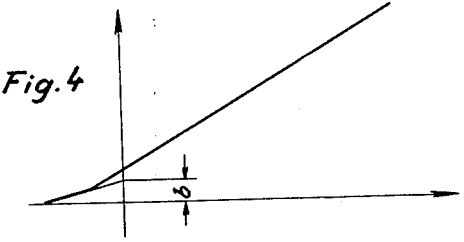

FIG. 4 shows the characteristic curve for a prestressed plate spring. This arrangement would probably not often be used in practice, since the ball and socket joint then has the same disadvantages as a joint having only a plate spring.

I claim:

1. Ball and socket joint comprising a stud having a ball head and a housing having an aperture at one end and means defining a spherical bearing surface adjacent said aperture, said ball head having bearing support on said spherical surface and said stud extending from said aperture, a closure plate received in the other end of said housing, said housing defining a hollow cylindrical space inwardly of said closure plate, a bearing ring in engagement with said ball head having an outer cylindrical surface slidingly received in said cylindrical space, said bearing ring having a portion projecting beyond said ball head, a plate spring of smaller diameter than that of said hollow cylindrical space having a border portion disposed on said projecting portion of said ring, said plate spring being movable with said ring, a conical coil spring extending between said plate spring and said closure plate and biasing said plate spring against said ring, said spring having a turn of larger diameter in engagement with said plate spring and a turn of smaller diameter in engagement with said closure plate, said plate spring having a curved portion of smaller curvature than the curvature of said ball head and projecting into said coil spring and towards said closure plate and said curved portion diverging from its apex toward said border portion while the distance of said curved portion from said closure plate increases and said apex being spaced from said closure plate by a distance smaller than the distance between said ring and said closure plate, the longitudinal extent of said cylindrical space above said bearing ring, while said apex is in contact with said closure plate, being of a magnitude permitting resilient movement of the outer portions of said coil spring and of said plate spring relative to said closure plate.

2. Ball and socket joint comprising a stud having a ball head and a housing having an aperture at one end and means defining a spherical bearing surface adjacent said aperture, said ball head having bearing support on said spherical surface and said stud extending from said aperture, a closure plate received in the other end of said housing, said housing defining a hollow cylindrical space inwardly of said closure plate, a bearing ring in engagement with said ball head having an outer cylindrical surface slidingly received in said cylindrical space, said bearing ring having a portion projecting beyond said ball head, a plate spring of smaller diameter than that of said hollow cylindrical space having a border portion disposed on said projecting portion of said ring, said plate spring being movable with said ring, a conical coil spring extending between said plate spring and said closure plate and biasing said plate spring against said ring, said spring having a turn of larger diameter in engagement with said plate spring and a turn of smaller diameter in engagement with said closure plate, said plate spring having a curved portion of smaller curvature than the curvature of said ball head and projecting into said coil spring and towards said closure plate and said curved portion diverging from its apex toward said border portion while the distance of said curved portion from said closure plate increases and said apex being spaced from said closure plate by a distance smaller than the distance between said ring and said closure plate, the longitudinal extent of said cylindrical space above said bearing ring, while said apex is in contact with said closure plate, being of a magnitude permitting resilient movement of the outer portions of said coil spring and of said plate spring relative to said closure plate, said border portion being spaced a greater distance from said closure plate than said curved portion and said coil spring having engagement with said border portion.

References Cited in the file of this patent

UNITED STATES PATENTS

| | | |
|---|---|---|
| 2,298,544 | Ulinski | Oct. 13, 1942 |
| 2,322,757 | Ward | June 29, 1943 |
| 2,516,688 | Flumerfelt | July 25, 1950 |
| 2,838,330 | Fidler | June 20, 1958 |
| 2,912,267 | Latzen | Nov. 10, 1959 |

FOREIGN PATENTS

| | | |
|---|---|---|
| 1,014,441 | Germany | Aug. 27, 1957 |

OTHER REFERENCES

Germany, E 10373 11/63c, July 26, 1956.